US 8,102,280 B2

(12) United States Patent
Cahill

(10) Patent No.: US 8,102,280 B2
(45) Date of Patent: Jan. 24, 2012

(54) SYSTEM AND METHOD FOR DETECTING A DRAGGING BRAKE

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 471 days.

(21) Appl. No.: 12/397,090

(22) Filed: Mar. 3, 2009

(65) Prior Publication Data

US 2010/0225503 A1    Sep. 9, 2010

(51) Int. Cl.
*G08B 21/00* (2006.01)

(52) U.S. Cl. ........................................................ 340/960

(58) Field of Classification Search .................. 340/960, 340/933, 438, 444, 449, 467; 303/126; 701/3, 701/8, 70

See application file for complete search history.

(56) References Cited

U.S. PATENT DOCUMENTS

| 4,326,755 | A  | * | 4/1982  | Fretz, III ........................ 303/176 |
| 6,178,370 | B1 | * | 1/2001  | Zierolf ............................. 701/71 |
| 6,417,768 | B2 | * | 7/2002  | Osterman et al. ............... 340/479 |
| 6,604,708 | B1 | * | 8/2003  | DeVlieg ........................... 244/111 |
| 6,871,728 | B2 | * | 3/2005  | Kamiya et al. ............ 188/1.11 R |
| 7,441,844 | B2 | * | 10/2008 | DeVlieg et al. ................. 303/126 |
| 2005/0216160 | A1 | * | 9/2005 | Zumberge et al. ............... 701/70 |

* cited by examiner

*Primary Examiner* — Phung Nguyen

(74) *Attorney, Agent, or Firm* — Snell & Wilmer L.L.P.

(57) ABSTRACT

Systems and methods to determine whether a brake is dragging based on post-takeoff spindown data are provided. The method comprises measuring spindown of a wheel to obtain spindown data. The spindown data is compared with a spindown envelope, and notification is provided if the spindown data indicates a wheel is spinning down outside a spindown envelope.

16 Claims, 9 Drawing Sheets

SYSTEM AND METHOD FOR DETECTING A DRAGGING BRAKE

FIELD OF THE INVENTION

The present invention generally relates to braking systems, and more particularly, to systems and methods to determine the presence of a dragging brake.

BACKGROUND

During takeoff, an aircraft reaches high speeds and as such, the wheels of the aircraft also rotate at a high rate of speed. Once the aircraft takes off, the wheels begin to "spindown." Spindown is known in the art as the natural deceleration of the wheels after takeoff. After the wheels have sufficiently spundown, the wheels (along with the landing gear) are typically retracted and stored within the landing gear bay in the aircraft fuselage.

If a brake on a wheel is dragging (i.e., is at least partially engaged), then the brake may heat itself and/or other landing gear and/or wheel components to a very high temperature. The brakes may drag for a number of reasons, including over pressurization of the brake, a parked brake that is too hot because it has not cooled sufficiently after a previous landing and corresponding brake engagement, a broken brake rotor/stator, an improper brake adjustment, ice wedged between the pressure plate of the brake and the actuator, and the like. Brake dragging and the resulting heat are undesirable because, if the wheel and brake are retracted into the bay while hot, there may be an increased risk of failure (for example, the tire may rupture and expel a portion of the tire or wheel through the fuselage, damaging the aircraft). Accordingly, it is desirable to determine whether a brake is dragging in order to implement an appropriate response.

SUMMARY

Systems and methods for detecting a dragging brake are provided. In an embodiment, a method for detecting a dragging brake comprises measuring spindown of a wheel to obtain spindown data, comparing the spindown data to a spindown envelope, and providing a dragging brake notification responsive to the spindown data being outside the spindown envelope.

In another embodiment, a method for detecting a dragging brake comprises comparing first spindown data from a first wheel with a first spindown envelope, and providing a dragging brake notification responsive to the first spindown data being outside the first spindown envelope.

In another embodiment, a system for detecting a dragging brake comprises a first sensor configured to acquire first spindown data from a first wheel, and a control system in communication with the first sensor. The control system is configured to compare the first spindown data to a spindown envelope. A notification system is in communication with the control system. The notification system is configured to provide a dragging brake notification responsive to the first spindown data being outside the spindown envelope.

DETAILED DESCRIPTION

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

As disclosed herein, systems and methods may be configured to evaluate an aircraft wheel after takeoff to determine whether the aircraft wheel is spinning down outside a spindown envelope. For purposes of this disclosure, a "spindown envelope" is a set or range of expected and/or acceptable spindown parameters for one or more wheels (for example, a range of wheel angular velocities, a range of wheel kinetic energies, and the like, and/or combinations of the same). For example, after takeoff, an aircraft landing gear weight-on-wheels indicator changes from an on-ground state to an in-flight state. Initially, the system takes spindown data measurements for one or more wheels. The system then determines if the spindown data measurements of the various wheels of the aircraft indicate the presence of a dragging brake. For example, if the spindown data measurements of the wheels are within a spindown envelope, then the system determines that no brake drag is occurring. However, if the spindown data measurements are outside a spindown envelope (i.e., if one or more wheels are decelerating at a different rate than an expected spindown rate), then the wheel or wheels may have an excessive drag force imposed on them, which may be an indicator of a dragging brake. Accordingly, the control system may activate an alert indicating brake drag. Based on this alert, the crew, maintenance team, or other aircraft systems may be informed of the excessive drag force in order to respond appropriately.

Figure 1:
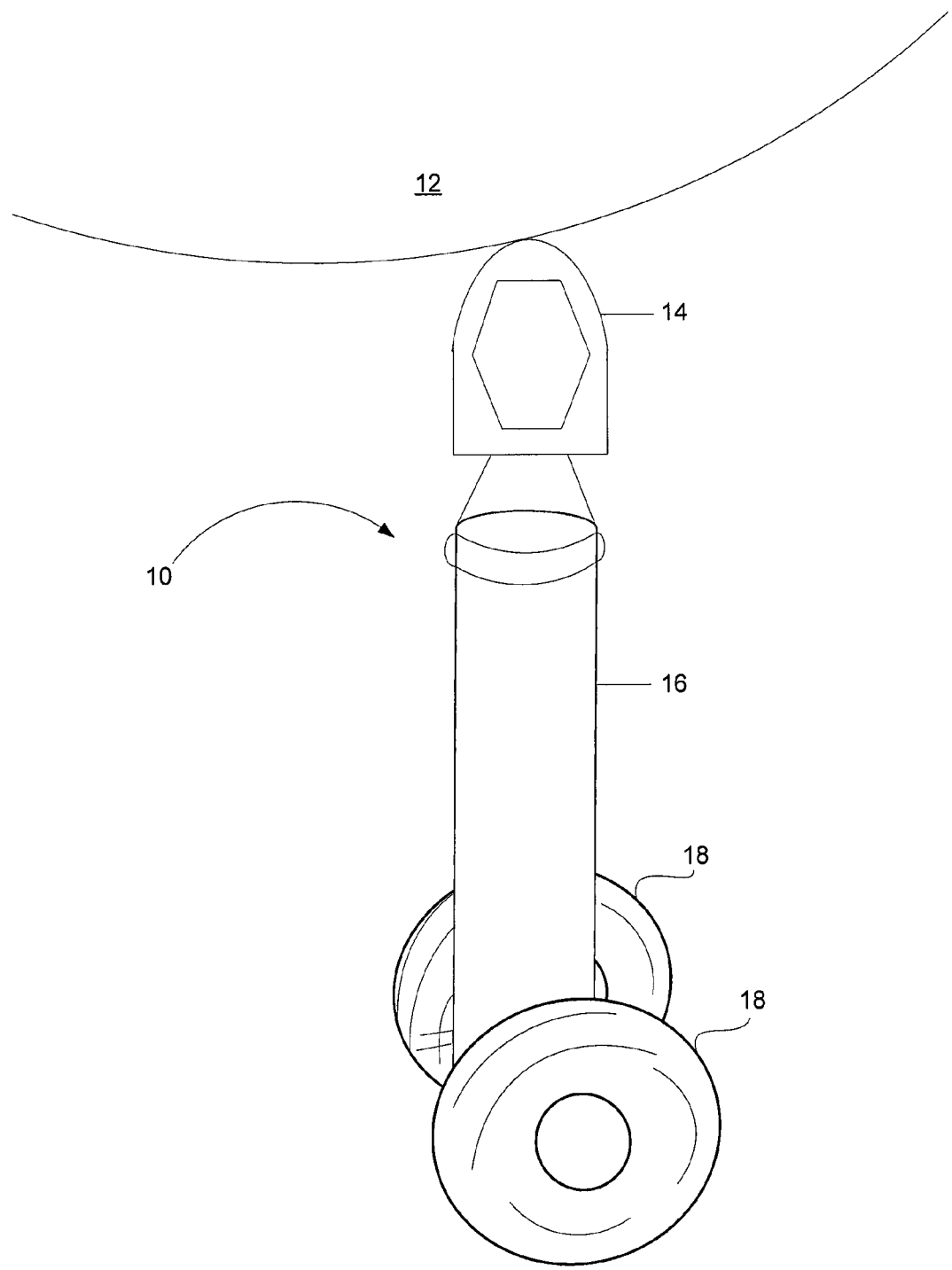
FIG. 1 illustrates a basic aircraft landing gear, having two (2) wheels, in an extended position in accordance with an embodiment.
Figure 2:
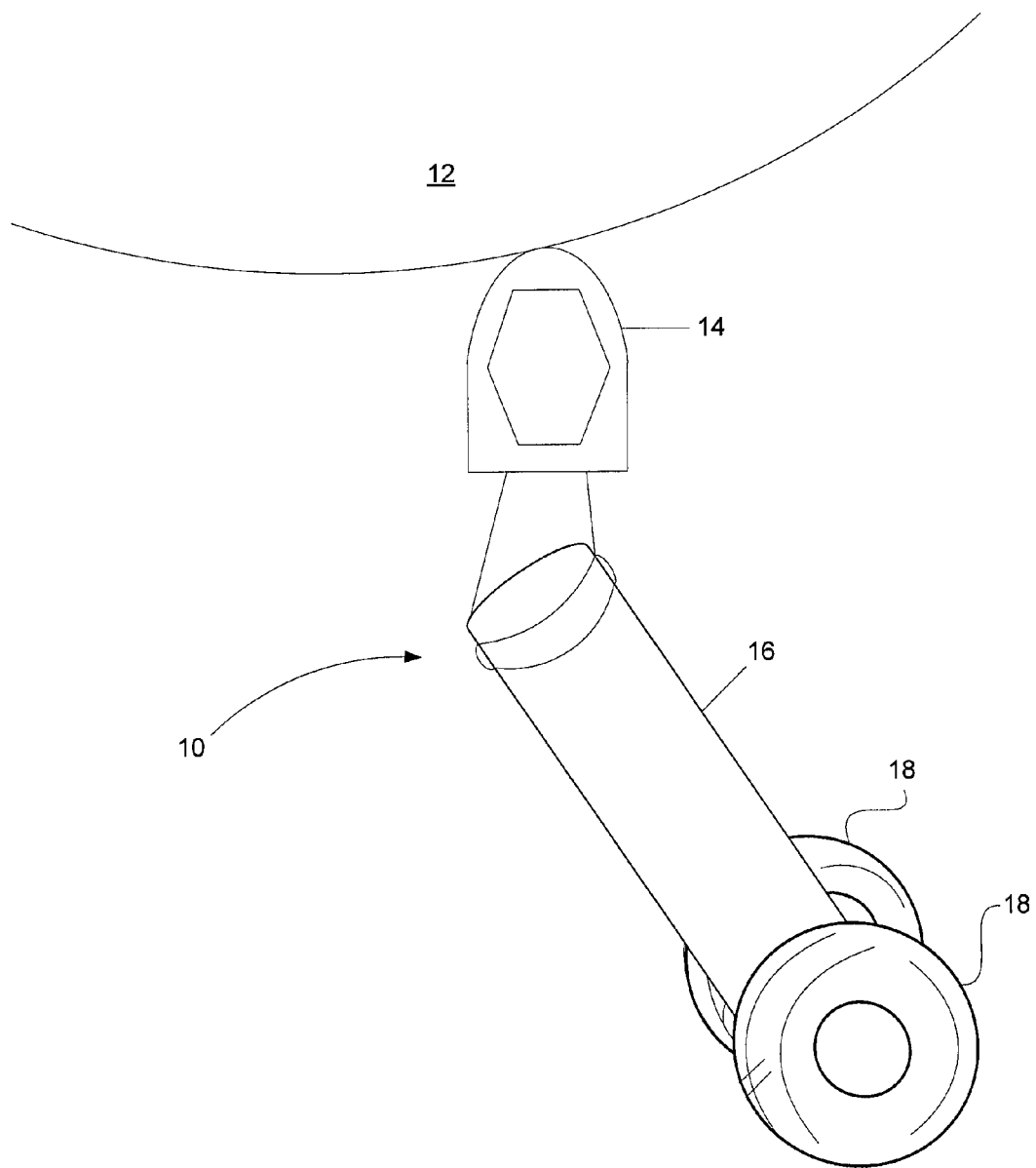
FIG. 2 illustrates a basic aircraft landing gear, having two (2) wheels, in a partially retracted position in accordance with an embodiment.

Referring now to FIGS. 1 and 2 and in an embodiment, a basic landing gear 10 is illustrated. FIG. 1 shows landing gear 10 in a fully extended position, while FIG. 2 shows landing gear 10 in a partially retracted position. It should be understood by one of ordinary skill in the art that as an aircraft takes off, landing gear 10 moves from a fully extended position, to a partially retracted position, to a fully retracted position where landing gear 10 is stowed within the aircraft fuselage. FIGS. 1 and 2 show landing gear 10 rotatably connected with an aircraft 12 via a coupling mechanism 14. In various embodiments, any suitable coupling mechanism can be used. Landing gear mechanism 10 includes a main column 16 and at least two wheels 18 rotatably coupled therewith. In various embodiments, any suitable coupling of main column 16 and wheels 18 may be used. While not illustrated in FIG. 1 or 2, one or more brakes may be attached to each of the wheels 18 in a manner understood by one of ordinary skill in the art. In various embodiments, the brakes are located within the wheel hubs.

Figure 3:
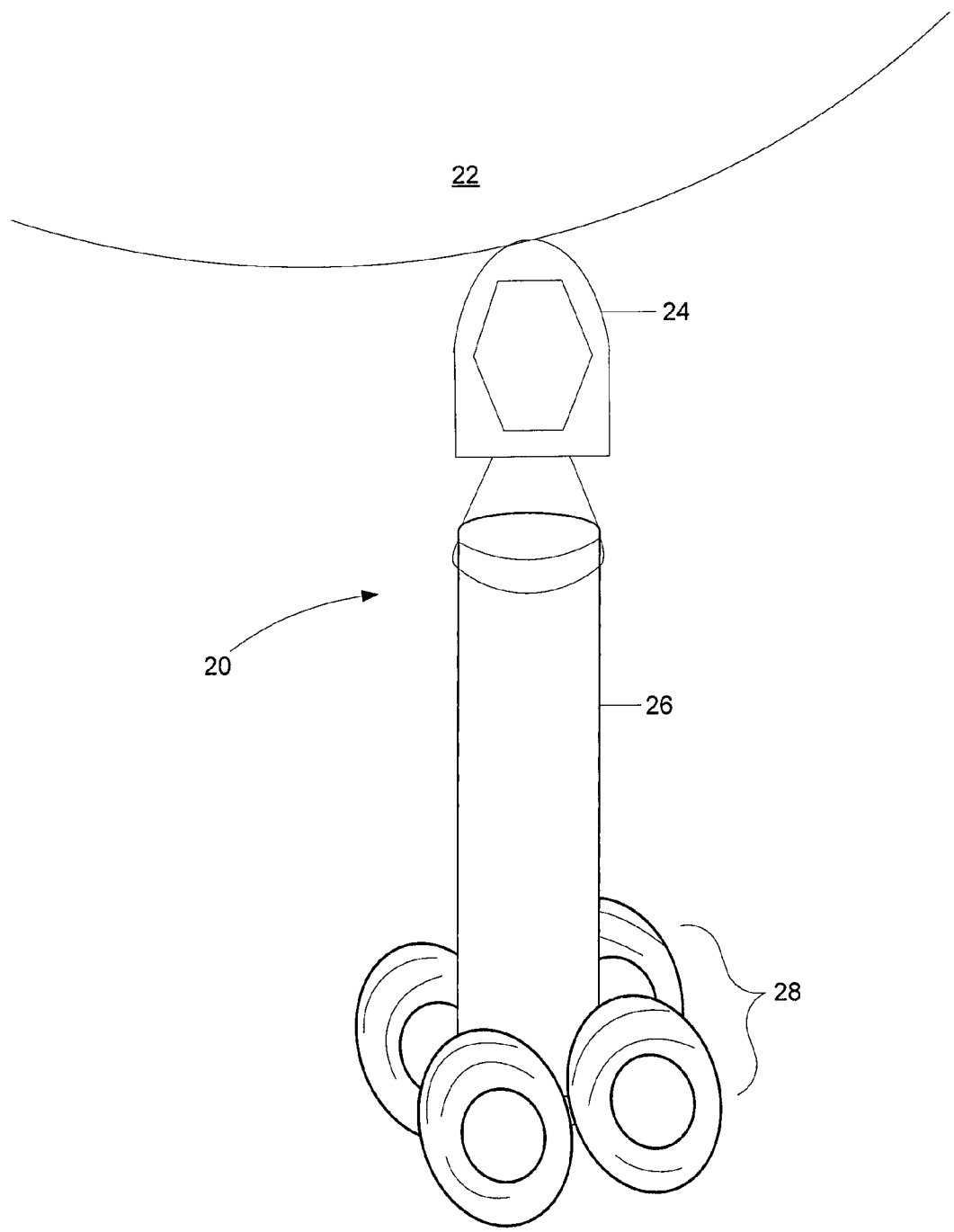
FIG. 3 illustrates a basic aircraft landing gear, having four (4) wheels, in an extended position in accordance with an embodiment.
Figure 4:
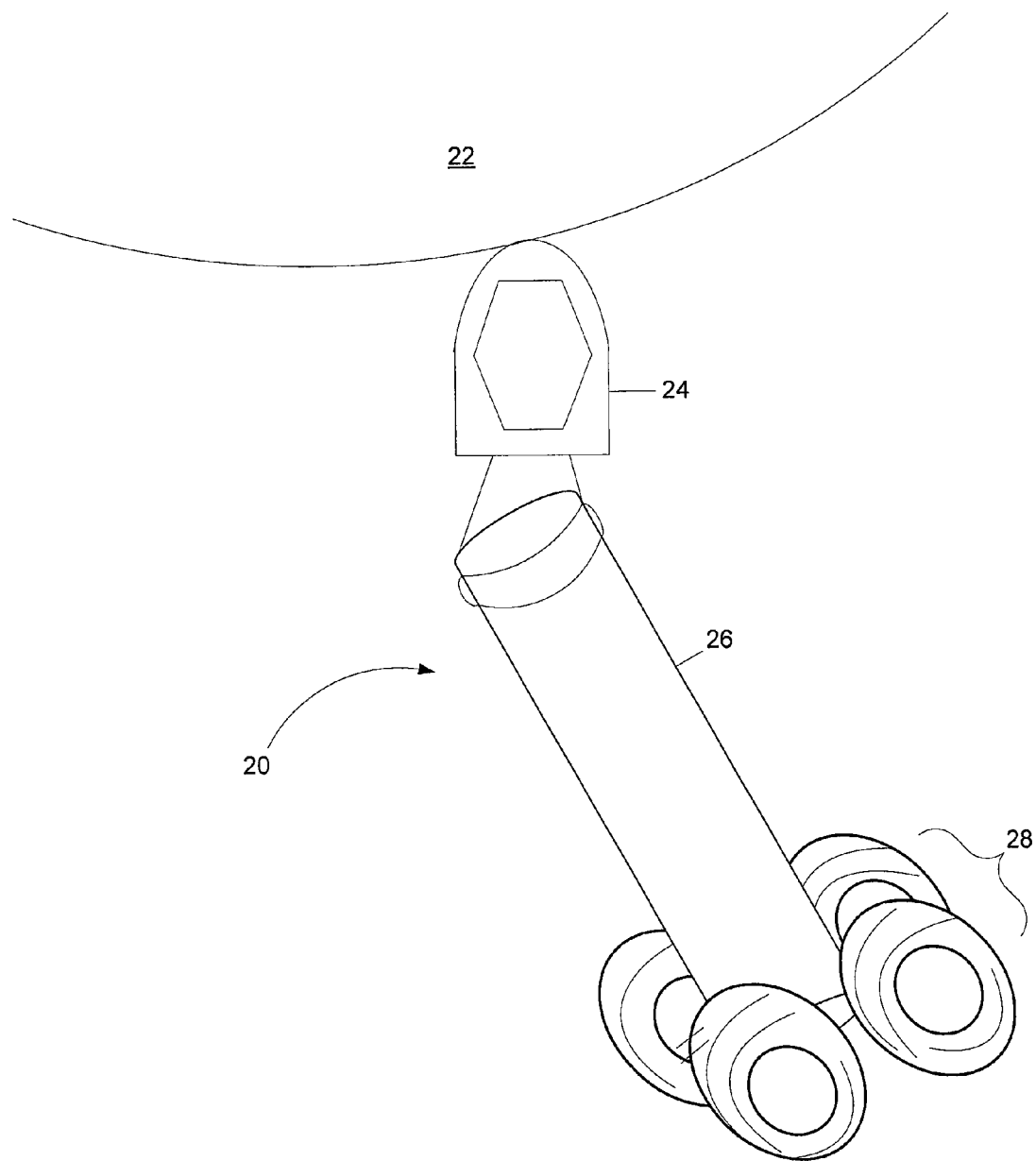
FIG. 4 illustrates a basic aircraft landing gear, having four (4) wheels, in a partially retracted position in accordance with an embodiment.

Referring now to FIGS. 3 and 4 and in an embodiment, a basic landing gear 20 is illustrated. FIG. 3 shows landing gear 20 in a fully extended position, while FIG. 4 shows landing gear 20 in a partially retracted position. It should be understood by one of ordinary skill in the art that as an aircraft takes off, landing gear 20 moves from a fully extended position, to a partially retracted position, to a fully retracted position where landing gear 20 is stowed within the aircraft fuselage. FIGS. 3 and 4 show landing gear 20 rotatably connected with an aircraft 22 via a coupling mechanism 24. In various embodiments, any suitable coupling mechanism can be used. Landing gear 20 includes a main column 26 and a plurality of wheels 28 rotatably coupled therewith. Likewise, in various embodiments, any suitable coupling of main column 26 and the plurality of wheels 28 may be used. While not illustrated in FIGS. 3 and 4, one or more brakes may be attached to each of the wheels 28 in a manner understood by one of ordinary skill in the art. Additionally, while only two-wheel and four-wheel embodiments are shown in FIGS. 1-4, any number of wheels and associated brakes suitable for use in a landing gear assembly may be used.

Figure 5:
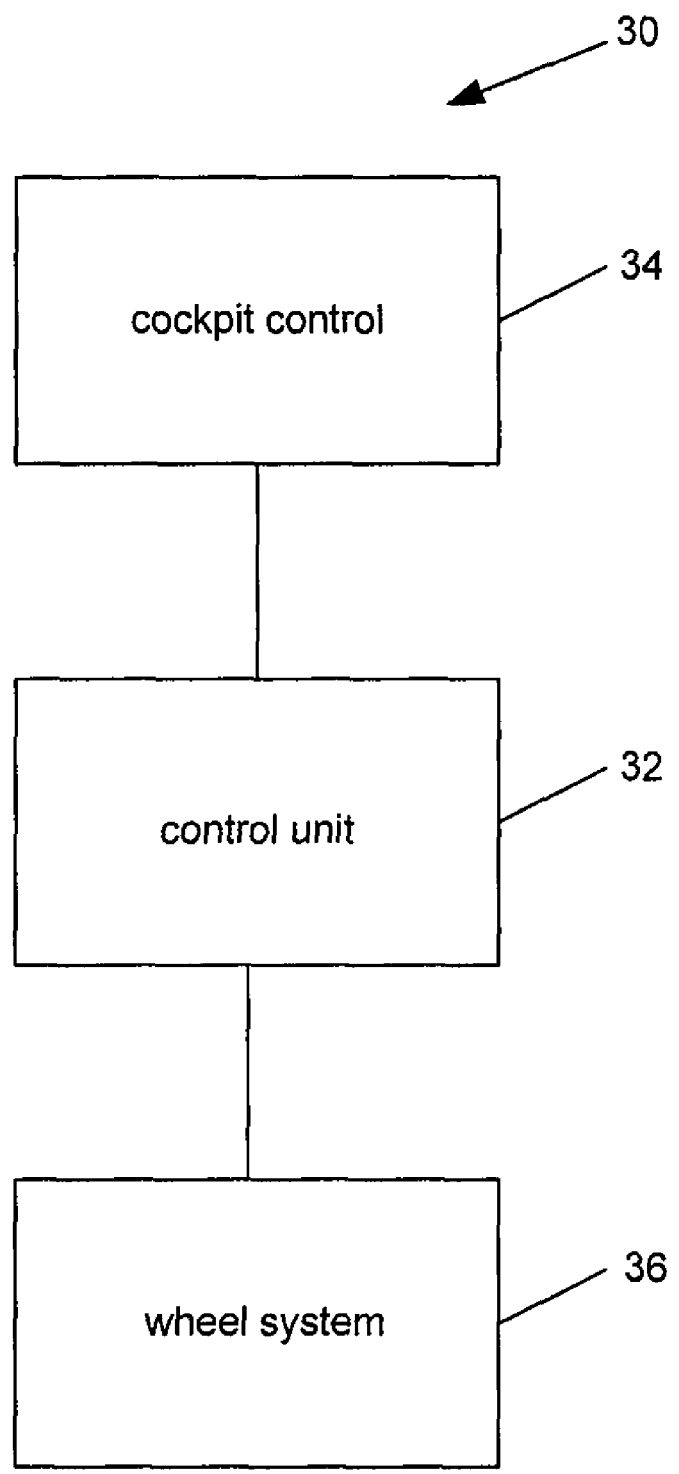
FIG. 5 illustrates a block diagram of a system configured to detect a dragging brake in accordance with an embodiment.

In an embodiment, FIG. 5 illustrates a system 30 configured to monitor wheel spindown data (for example, wheel angular velocity, wheel rotational energy, and the like) of an aircraft after takeoff. System 30 comprises a control system 32 configured to communicate (e.g., electronically, optically, and the like) with a cockpit control 34 and a wheel system 36. Wheel system 36 is configured to measure one or more wheel spindown data components. For example, wheel system 36 may comprise wheel speed monitoring devices. In an embodiment, control system 32 comprises a software and/or hardware computer-based system configured to analyze signals received from wheel system 36 and cockpit control 34 to provide feedback to the flight crew through cockpit control 34. Cockpit control 34 may include alerting components. Additionally, in various embodiments, incidents of any alerts noted above may be recorded in memory for later retrieval within the brake control system 22 built in test equipment (BITE).

As mentioned above, systems and methods in accordance with various embodiments determine whether an aircraft wheel is spinning down outside a spindown envelope. As stated above, when an aircraft is taking off, the aircraft reaches a high rate of speed. The aircraft wheels also reach a high rate of speed, typically due to frictional contact with the ground. Once the aircraft takes off, external forces causing wheel spin are substantially reduced and/or removed, and thus the wheels begin to spindown towards a complete stop (zero rotational wheel speed). Often, due to the highly effective braking systems on an aircraft, a dragging brake will cause a rapid reduction in wheel speed shortly after takeoff. Ideally, all of the wheels spindown at similar rates. However, if a wheel spins down faster than another wheel (a "flagged spindown"), then it may be an indication that the more rapidly decelerating wheel is subject to one or more outside forces, such as friction from a dragging brake, as opposed to other normal, expected forces such as bearing drag, atmospheric friction, and the like.

In an embodiment, system 30 is configured with an algorithm for evaluating whether a deviation exists between a spindown envelope and a flagged spindown. For example, a spindown envelope may be generated based at least in part on: (1) real-time spindown data; (2) past spindown data; (3) empirical spindown data, and the like, or any combination thereof.

Figure 6:
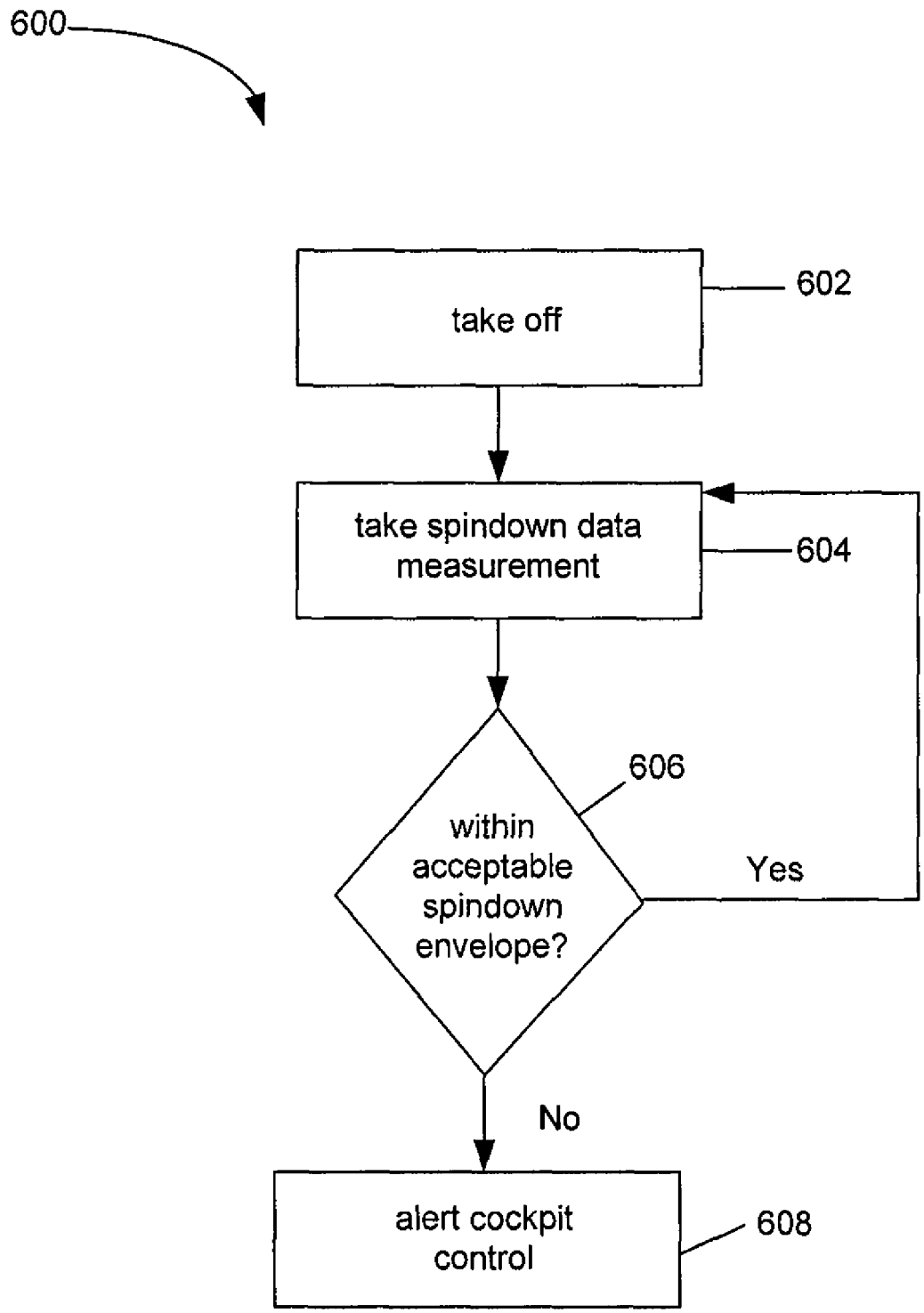
FIG. 6 illustrates a flow diagram for the system of FIG. 5 in accordance with an embodiment.

In an embodiment, FIG. 6 illustrates an exemplary flow diagram 600 of the system 30 shown in FIG. 5. For real-time spindown data, on a two wheel aircraft, as shown in FIGS. 1 and 2, the wheel with the highest velocity may be used at least partially to generate a spindown envelope. In other words, the velocity of a first wheel may be used as a benchmark for comparison with another wheel's velocity versus time. In another embodiment, for example, an aircraft with more than two wheels (such as shown in FIGS. 3 and 4) may provide additional spindown data. As such, a real-time comparison between the spindown data of the wheels may be improved, due to the presence of additional wheels for which measurements of spindown data can be compared.

Moreover, spindown measurements from one or more wheels may be utilized to construct an average spindown profile. For example, for an aircraft having three landing gears, each with four wheels, all twelve wheels may be expected to spindown at approximately the same rate. Thus, spindown data for all twelve wheels may be utilized to construct an average spindown profile for the aircraft. A significantly large deviation from an aircraft's average spindown profile may indicate a dragging brake. For example, a wheel which slows down more than 5% faster than the average spindown profile, a wheel having less than 1000 foot-pounds of energy three seconds after the wheel has left contact with the ground, or a wheel having a velocity at least 20 knots slower than the average spindown profile at any point on the profile, and the like, may indicate a dragging brake. In various embodiments, an average spindown profile may lie entirely within a spindown envelope.

With continued reference to FIG. 6, in various embodiments, after takeoff, the landing gear's weight-on-wheels indicator changes from an on-ground state to an in-flight state (step 602). While in the in-flight state, wheel system 36 takes one or more spindown data measurements for each of the wheels (step 604). The wheel or wheels with the lowest deceleration rate (in other words, the wheel with the highest present velocity) may at least partially define a spindown envelope. Control system 32 determines if there is a deviation between the spindown envelope and the spindown data measurements for each wheel (step 606). For example, if the spindown data measurements of the wheels are approximately the same, then no brake drag is occurring and the process may return to step 604. However, if spindown data measurements for one or more wheels are outside the spindown envelope (i.e., where at least one wheel is decelerating at an excessive rate), then at least one wheel may have an excessive drag force imposed on it. In response to a wheel spindown outside a spindown envelope, control system 32 alerts cockpit control 34 (step 608). Based on this condition, the crew, maintenance or other aircraft systems may be alerted by the cockpit control 34.

In various embodiments, determination of a wheel spindown outside a spindown envelope may be determined in any suitable way. For example, the spindown envelope may be determined by a flat percent of distance, velocity, deceleration, or energy left or consumed over time. Any other systems or methods which delineate an atypical force retarding a wheel's speed at a rate outside a spindown envelope (i.e., the normal aerodynamic drag from tire rotation and/or aircraft speed, bearing drag, or the like) may be used. In various embodiments, the spindown envelope may also account for a tolerance arising at least partially from one or more known affects based on experience/or and environmental conditions. For example, a spindown envelope may account for one or more tolerances imposed by differing aircraft tire types (radial, bias ply, and the like) and manufacturers, different torque on the axle nuts and corresponding bearing preload forces, different levels of lubrication, different weather conditions (rain, snow, hail, ice, and the like), various takeoff speeds, and/or different ambient and/or operating temperatures, and the like.

Figure 7:
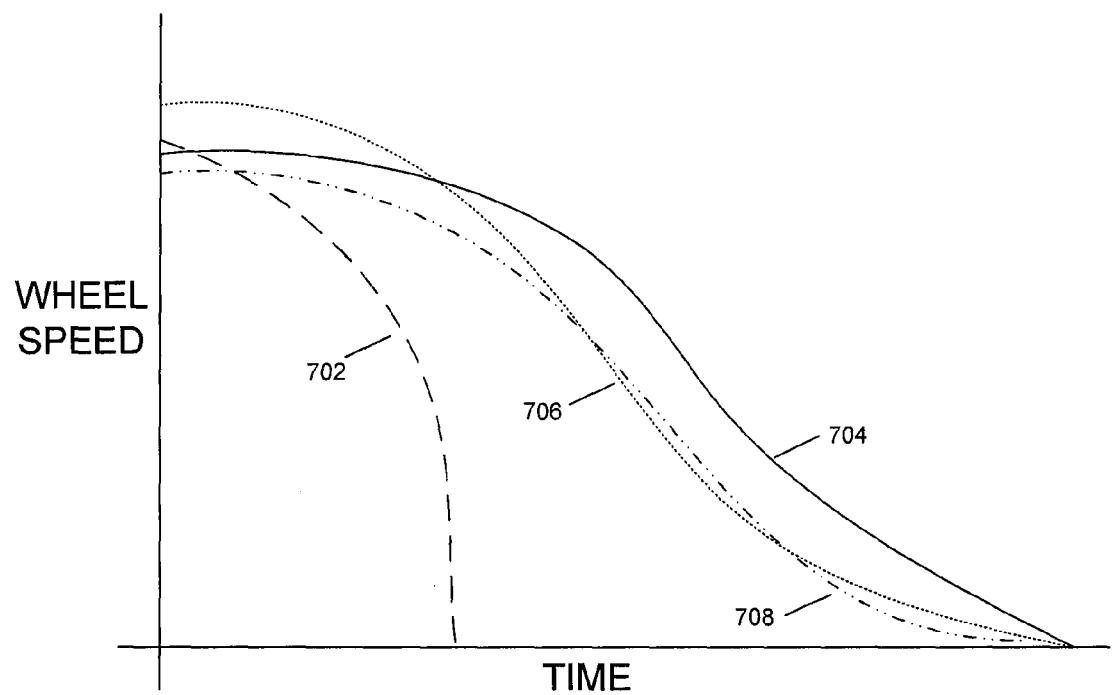
FIG. 7 illustrates a dragging brake versus normal spindown of the wheels of an aircraft in accordance with an embodiment.

Turning now to FIG. 7, and in an embodiment, the effect of a dragging brake versus normal spindown of the wheels is illustrated. In other words, FIG. 7 illustrates what an observer may measure with wheel system 36 if one of four wheels has a dragging brake, and the other wheels are allowed to spindown on their own. Individual wheel speeds 702, 704, 706, and 708 are shown. Wheel speeds 704, 706, and 708 remain generally within a consistent spindown envelope, while wheel speed 702 falls off more quickly. Faster deceleration of a wheel with a dragging brake may be pronounced.

Figure 8:
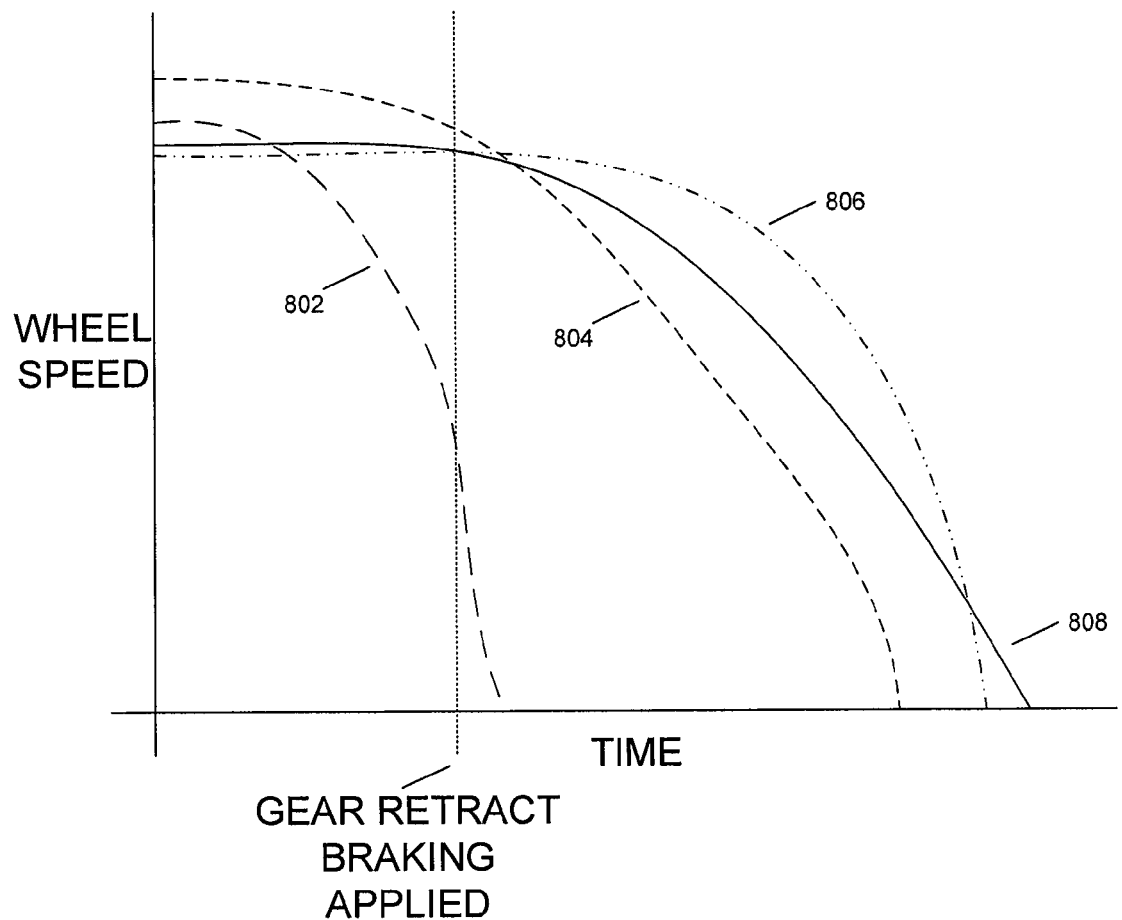
FIG. 8 illustrates a dragging brake versus gear retract braking of the wheels of an aircraft in accordance with an embodiment.

Moreover, gear retract braking may also be used to decelerate the wheels before fully retracting the landing gear into the bay within the fuselage. Gear retract braking is known in the art as a braking technique which assists the deceleration of the wheels of the aircraft by providing additional braking to the wheels after takeoff. In accordance with an embodiment, FIG. 8 illustrates the effect of a dragging brake versus gear retract braking of the wheels. In other words, FIG. 8 illustrates what an observer may measure with the wheel system 36 if one of four wheels has a dragging brake, and all wheels are subject to gear retract braking. Individual wheel speeds 802, 804, 806, and 808 are shown. Deceleration of a wheel, for example the wheel having wheel speed 802, outside a spindown envelope may still be pronounced even when gear retract braking is used. Stated another way, there is often sufficient time between takeoff and landing gear retraction (and associated gear retract braking) to enable detection of a dragging brake. Thus, the present systems and methods may potentially be employed when gear retract braking is used.

Other conditions may also influence the spindown data for a wheel. For example, the ambient temperature, as measured by a brake temperature monitoring system or other aircraft systems, may provide additional insight into the spindown data. For example, an extremely cold bearing may have more drag than a hot bearing. Similarly, a cold lubricant may have a higher frictional coefficient than a warm lubricant. In various embodiments, these and other factors may be at least partially accounted for by control system 32.

As mentioned above, in various embodiments, past spindown data may also be used to determine whether a brake is dragging. Past spindown data may include a statistically bounded spindown curve based at least in part on spindown history for a particular aircraft. Various limits may be included to prevent dynamic data from skewing the expected spindown curve. Additionally, the spindown curve may start out as a static curve and evolve into an aircraft specific curve based at least in part on a number of parameters. For example, wheel velocity data may be captured for a particular aircraft on an initial takeoff. A wheel velocity vs. time profile may be created for one or more wheels. Additional data, for example ambient temperature, laboratory test results for tires certified for use on the aircraft in question, takeoff speed wheel inertia, and the like, may also be gathered and/or used. A standard deviation may then be calculated for each wheel deceleration at one or more sample points in time. To improve data integrity and/or system reliability, the resulting wheel profile may be compared with a reference curve to ensure readings are within an acceptable limit. Statistical methods (for example, a t-distribution) may be employed in order to create a spindown envelope, for example a four standard deviation (4s) envelope. If a wheel's velocity at particular point in time falls past a pre-determined point on the t-curve (in other words, if the wheel velocity at a point in time is sufficiently below a corresponding expected velocity), then control system 32 may identify a dragging brake for that wheel. Moreover, under certain conditions, for example when the ambient temperature is below −10 degrees Fahrenheit, control system 32 may also void and/or ignore measurements and/or calculations which might otherwise indicate a dragging brake.

In various embodiments, the spindown curve may also be modified based on limited history. In various embodiments, and with reference again to FIG. 6, past aircraft spindown data may be used as the spindown limit in step 606. In such cases, control system 32 determines whether there is sufficient deviation between the past aircraft spindown data and the current spindown measurements. If a wheel spins down too fast (i.e., outside the expected tolerance), then a deviation exists, and the control system 32 alerts the cockpit control 34, and thus, the aircraft's crew or maintenance system.

As noted above, in various embodiments, empirical spindown data may also be used to determine whether a brake is dragging. Empirical spindown data may be based at least in part on laboratory data, experience, and/or environmental and assembly tolerances. Typical and worst-case spindown curves may be developed and implemented.

With reference again to FIG. 6, empirical spindown data may be used at least partially to determine a spindown envelope in steps 606. In such cases, the control system 32 determines whether there is sufficient deviation between the empirical spindown data and the current spindown measurements, if any. If a wheel spins down too fast (i.e., outside the expected tolerance), then a deviation exists and the control system 32 alerts the cockpit control 34, and thus, the aircraft's crew and/or maintenance system.

Figure 9:
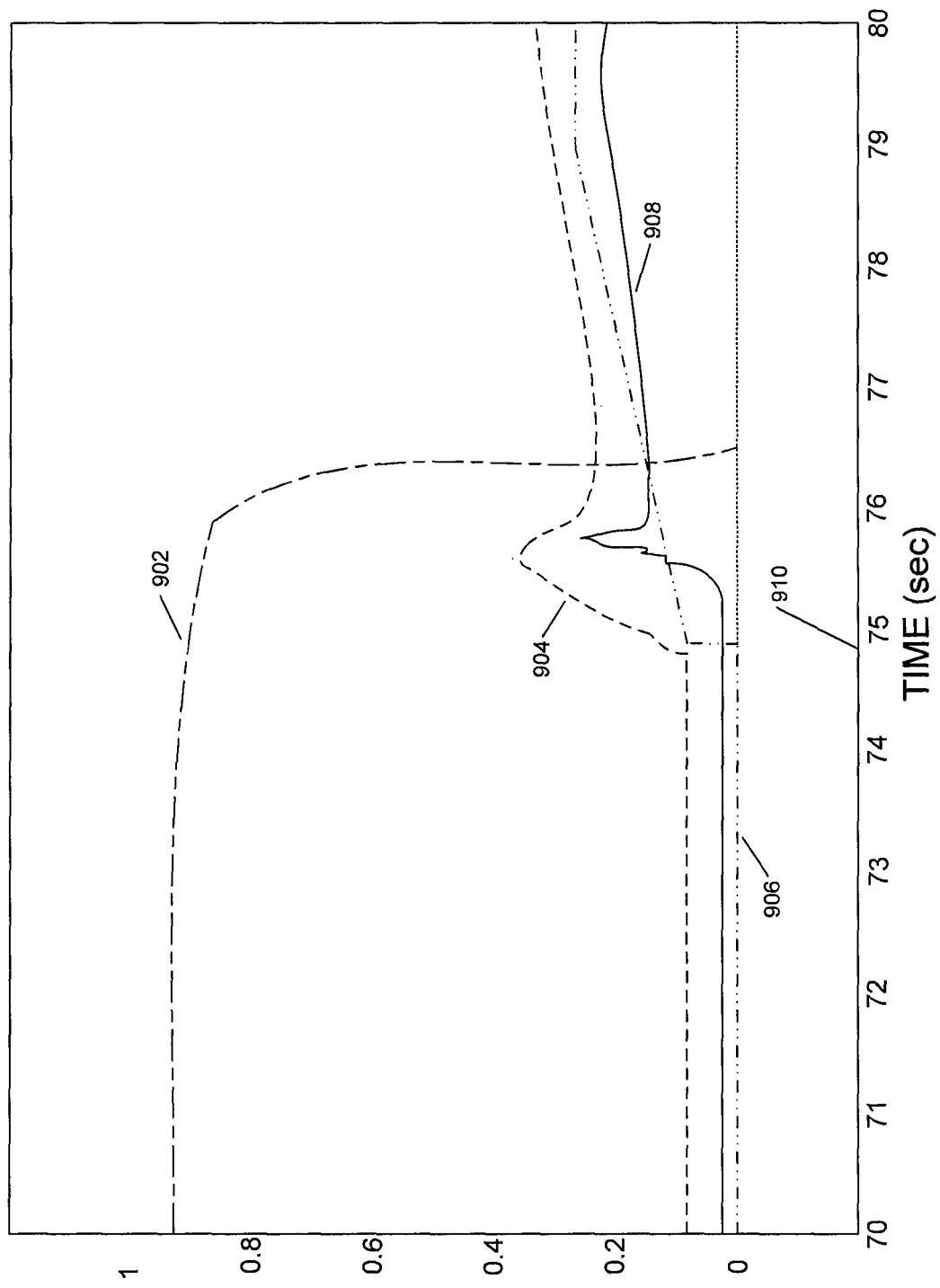
FIG. 9 illustrates various parameters of an aircraft brake system in accordance with an embodiment.

Turning now to FIG. 9, in an embodiment, gear retract braking is illustrated via a normalized graph showing wheel speed 902, brake servo valve current 904, commanded brake torque 906, and measured brake torque 908. The aircraft has left the ground, and thus wheel speed 902 declines gradually as time progresses. Commanded brake torque 906 is zero before gear retract braking is commanded, and brake servo valve current is minimal. At time location 910, gear retract braking is commanded. Current 904 begins to rise, and commanded brake torque 906 also rises. Measured brake torque 908 slightly lags commanded brake torque 906 due to mechanical and/or electrical delays. Measured brake torque 908 spikes as the brake initially engages, and then approaches commanded brake torque 906. Wheel speed 902 rapidly declines once measured brake torque 908 begins to rise. Once wheel speed 902 has been reduced to an acceptable level, the landing gear may be retracted within the fuselage.

In various embodiments, the tolerance or limits for a spindown envelope may be quantified by the dimensions of the parameters being measured. For example, if energy or power (energy per unit time) is used, then the limits may be set in ft-lbs, N-m, Watts, etc. It is also possible that several common dimensions be used, i.e., energy and deceleration. It is also possible to create an atypical unit, such as feet per second cubed ($ft/s^3$, also referred to as "jerk rate") to recognize a dragging brake condition. Stated another way, control system 32 may potentially utilize "non-classical" units when assessing the presence of a dragging brake. For example, a tolerance for change in energy per unit time (i.e., change in energy remaining in a spinning wheel at a point during the spindown time) may be assessed by calculating the difference between the present wheel energy and the initial wheel energy (i.e., the wheel energy at the point the wheel left contact with the ground). With this information, a wheel energy vs. time curve (a "delta energy curve") may be constructed. The derivative (slope) of the delta energy curve may be inspected for indications of a dragging brake, even though the associated units are not classically defined.

The methods described herein may be represented as instructions tangibly embodied on a computer-readable medium, for example, a magnetic storage device (e.g., a hard drive, a floppy drive, and the like), an optical storage device (e.g., a compact disc, a digital versatile disc, a Blu-ray disc, and the like), and/or a solid state storage device (a random access memory, a flash memory, and the like). Any suitable computer-readable medium may be utilized, for example, a tangible computer-readable medium having instructions stored thereon, the instructions comprising instructions to measure spindown data for at least one wheel, instructions to compare the spindown data to a spindown envelope, and instructions to provide a dragging brake notification responsive to the spindown data being outside the spindown envelope.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for detecting a dragging brake, the method comprising:
    measuring, by a brake control system, spindown of a wheel to obtain spindown data;
    comparing, by the brake control system, the spindown data to a spindown envelope; and
    providing, by the brake control system, a dragging brake notification responsive to the spindown data being outside the spindown envelope,
    wherein the spindown envelope is based at least in part on past spindown data.

2. The method of claim 1, wherein the spindown envelope is based at least in part on empirical spindown data.

3. The method of claim 1, wherein the spindown envelope is based at least in part on real-time spindown data from one or more additional wheels.

4. The method of claim 1, wherein the spindown data is determined to be outside the spindown envelope based on at least one of wheel energy, wheel velocity, wheel distance, wheel acceleration, or wheel jerk rate.

5. The method of claim 1, wherein the spindown envelope is based at least in part on gear retract braking.

6. A method for detecting a dragging brake, the method comprising:
    comparing, by a brake control system, first spindown data from a first wheel with a first spindown envelope; and
    providing, by the brake control system, a dragging brake notification responsive to the first spindown data being outside the first spindown envelop;
    wherein the first spindown envelope is determined based at least in part on past spindown data from the first wheel.

7. The method of claim 6, wherein the first spindown envelope is determined based at least in part on empirical spindown data from the first wheel.

8. The method of claim 6, further comprising comparing second spindown data from a second wheel with a second spindown envelope.

9. The method of claim 8, wherein the first spindown envelope is determined based at least in part on the second spindown data from the second wheel.

10. The method of claim 9, wherein the first spindown envelope is determined in real-time.

11. A system for detecting a dragging brake, the system comprising:
    a first sensor configured to acquire first spindown data from a first wheel;
    a control system in communication with the first sensor, wherein the control system is configured to compare the first spindown data to a spindown envelope;
    a notification system in communication with the control system,
    wherein the notification system is configured to provide a dragging brake notification responsive to the first spindown data being outside the spindown envelope; and
    wherein the spindown envelope is determined based at least in part on the wheel speed of the first wheel when the first wheel leaves contact with the ground.

12. The system of claim 11, wherein the first spindown data from the first wheel comprises wheel deceleration data.

13. The system of claim 11, further comprising a second sensor configured to acquire second spindown data from a second wheel.

14. The system of claim 13, wherein the spindown envelope is determined based at least in part on the first spindown data and the second spindown data being acquired in real time.

15. The system of claim 14, wherein the spindown envelope is from 100% to 70% of the greater of the angular distance traveled by the first wheel and the second wheel.

16. A tangible computer-readable medium having instructions stored thereon, the instructions comprising:
  instructions to measure spindown of a wheel to obtain spindown data;
  instructions to compare the spindown data to a spindown envelope; and
  instructions to provide a dragging brake notification responsive to the spindown data being outside the spindown envelope,
  wherein the spindown envelope is based at least in part on past spindown data.

* * * * *